US012670456B2

(12) United States Patent
Wilson

(10) Patent No.: US 12,670,456 B2
(45) Date of Patent: Jun. 30, 2026

(54) AUTOMATED FRAMEWORK FOR MANAGING PROCESS CONTROLS TO IMPROVE SYSTEM PERFORMANCE

(71) Applicant: T-Mobile USA, Inc., Bellevue, WA (US)

(72) Inventor: Linda Wilson, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 229 days.

(21) Appl. No.: 18/332,685

(22) Filed: Jun. 9, 2023

(65) Prior Publication Data

US 2023/0325514 A1 Oct. 12, 2023

Related U.S. Application Data

(63) Continuation of application No. 16/803,796, filed on Feb. 27, 2020, now Pat. No. 11,720,684.

(51) Int. Cl.
| | |
|---|---|
| *G06F 21/57* | (2013.01) |
| *G06F 16/904* | (2019.01) |
| *G06F 16/955* | (2019.01) |
| *G06Q 10/0633* | (2023.01) |
| *G06Q 10/0635* | (2023.01) |

(52) U.S. Cl.
CPC ....... *G06Q 10/0635* (2013.01); *G06F 21/577* (2013.01); *G06Q 10/0633* (2013.01); *G06F 16/904* (2019.01); *G06F 16/9558* (2019.01)

(58) Field of Classification Search
CPC ..................... G06Q 10/0633; G06Q 10/0635
See application file for complete search history.

(56) References Cited

U.S. PATENT DOCUMENTS

| | | | |
|---|---|---|---|
| 6,097,995 | A | 8/2000 | Tipton et al. |
| 7,260,549 | B2 | 8/2007 | Spielmann et al. |
| 7,433,829 | B2 | 10/2008 | Borgia et al. |
| 7,505,918 | B1 | 3/2009 | Spielmann et al. |
| 8,255,254 | B2 | 8/2012 | Kumar et al. |

(Continued)

OTHER PUBLICATIONS

Xu, Dong, Sai Srinivas Nageshwaraniyer, and Young-Jun Son. "A service-oriented simulation integration platform for hierarchical manufacturing planning and control." International Journal of Production Research 54.23 (2016): 7212-7230. (Year: 2016).*

(Continued)

*Primary Examiner* — Andre D Boyce
(74) *Attorney, Agent, or Firm* — Perkins Coie LLP

(57) ABSTRACT

The disclosed implementations include a computer-implemented method of a controls framework to monitor multiple controls of multiple processes. The method can include linking the multiple controls in a hierarchical arrangement with and obtaining information about compliance by a particular subsystem, a particular process, or a particular sub-process of the organization with a particular control. The method can further include generating a risk measure for the organization based on information about a quantity of controls, types of control, failure, or noncompliance with the particular control and communicating, by the central management component to a computing device coupled to the system, at least an indication of the risk measure.

20 Claims, 15 Drawing Sheets

(56) References Cited

U.S. PATENT DOCUMENTS

| | | | |
|---|---|---|---|
| 8,738,414 B1 | 5/2014 | Nagar et al. | |
| 9,965,735 B2 | 5/2018 | Ramesh Babu | |
| 10,019,677 B2 | 7/2018 | Gill et al. | |
| 10,021,138 B2 | 7/2018 | Gill et al. | |
| 10,176,003 B2 | 1/2019 | Zeng | |
| 10,210,470 B2 | 2/2019 | Datta Ray | |
| 2002/0059093 A1 | 5/2002 | Barton et al. | |
| 2005/0034098 A1* | 2/2005 | DeSchryver | G06Q 10/10 |
| | | | 717/101 |
| 2005/0197952 A1 | 9/2005 | Shea et al. | |
| 2006/0047561 A1 | 3/2006 | Bolton | |
| 2006/0101520 A1 | 5/2006 | Schumaker et al. | |
| 2006/0184473 A1* | 8/2006 | Eder | G06N 5/022 |
| | | | 706/20 |
| 2008/0040364 A1 | 2/2008 | Li | |
| 2008/0103857 A1 | 5/2008 | Yankovich et al. | |
| 2008/0154873 A1* | 6/2008 | Redlich | G06F 16/951 |
| | | | 707/999.005 |
| 2009/0171719 A1* | 7/2009 | Connington | G06Q 10/06 |
| | | | 715/771 |
| 2009/0265200 A1 | 10/2009 | Boswell et al. | |
| 2010/0324952 A1 | 12/2010 | Bastos et al. | |
| 2012/0011077 A1 | 1/2012 | Bhagat | |
| 2015/0227868 A1* | 8/2015 | Saraf | G06Q 10/0635 |
| | | | 705/7.28 |
| 2015/0302420 A1 | 10/2015 | Nair | |
| 2018/0322292 A1 | 11/2018 | Tedeschi | |
| 2019/0354690 A1 | 11/2019 | Brigandi | |

OTHER PUBLICATIONS

Papamichail, K. Nadia, and Ian Robertson. "Integrating decision making and regulation in the management control process." Omega 33.4 (2005): 319-332. (Year: 2005).*
Yang, ShuangHua, X. Chen, and J. L. Alty. "Design issues and implementation of internet-based process control systems." Control engineering practice 11.6 (2003): 709-720. (Year: 2003).*

* cited by examiner

Support Tool

Use the Support tool to review change out requirements, track progress towards compliance, and to create / resolve issues online for your location.

Need to know

- xxxxxxxxxxxxxxxxxxxxxxxxxxxxxxxxxxxxxxxxxxxxxxxxxxxx
- xxxxxxxxxxxxxxxxxxxxxxxxxxxxxxxxxxxxxxxxxxxxx
  - Example:
    - xxxxxxxxxxxxxxxxxxxxxxxxxxxxx
- xxxxxxxxxxxxxxxxxxxxxxxxxxxxxxxxxxxxxxxxxxxxxxxxxxxxxxxxxxx
- xxxxxxxxxxxxxxxxxxxxxxxxxxxxxxxxxxxxxxxxx
- xxxxxxxxxxxxxxxxxxxxxxxxxxxxxxxxxxxxx
  - Example:
    - xxxxxxxxxxxxxxxxxxxxxxxxxxxxxxxxxxxxxxxxxxxxxxxxxx

Access the Tool

Option A: xxxxxxxxxxxxxxxxxxxxxxxxxxxxxxxxxxxxxxxxxxxxxxxxxxxxxxxxxxxxxx

Option B: xxxxxxxxxxxxxxxxxxxxxxxxxxxxxxxxxxxxxxxxxxxxxxxxxxxxxxxxxxxxxxxx

Executing a Campaign

1. xxxxxxxxxxxxxxxxxxxxxxxxxxxxxxxxxxxxxxxxxxxxxxxxxxxxxxxxxxxxxxxxxxxx
2. xxxxxxxxxxxxxxxxxxxxxxxxxxxxxxxxxxxxxx
3. xxxxxxxxxxxxxxxxxxxxxxxxxxxxxxxxxxxxxxxxxxxxxxxxxxxxxxxxxxxxxxxxx

| Total Controls 902 | Total Processes 904 |
|---|---|
| 83 | 169 |

Control-to-Process 906

| ID – Control Name | Process (Level 1 – 3) |
|---|---|
| 1 – NSEIP Process Adherence Audit | 3 – Servicing > 1 – Device Financing Product Redemption > 4 – No Service EIP (NSEIP) |
| 6 – NSEIP Manual Adjustment Prevention | 3 – Servicing > 1 – Device Financing Product Redemption > 4 – No Service EIP (NSEIP) |
| | 3 – Servicing > 2 – Billing > 9 – Manual Plan Credit/Adjustment |
| 12 – NSEIP Subscriber Reporting | 5 – Back Office > 4 – Reporting > 2 – Subscriber Reporting |
| 64 – System Prevention of Credit Extension Misuse | 1 – Presale > 7 – Credit Request > 25 – ECL Temporary Increase (Temp Double) |
| 69 – FBC RBM EFPE Promotions Monitor | 3 – Servicing > 13 – Promotions > 1 – Systematic Promotion Enrollment |
| | 3 – Servicing > 13 – Promotions > 2 – Systematic Promotion Unenrollment |
| | 3 – Servicing > 13 – Promotions > 3 – Systematic Promotion Re-Enrollment |
| 74 – FinCO RBM Pricing | 1 – Presale > 6 – Credit Eligibility > 1 – Device Eligibility |
| 87 – Systemic PostVoid of Sale | 2 – Origination/Creation > 1 – Tender/Check Out > 3 – Payment Method (Tender) |
| 107 – FinCo IMEI Weekly Clean up | 3 – Servicing > 12 – Insurance Claim > 2 – Lost/Stolen Device Claim |
| | 3 – Servicing > 13 – Promotions > 3 – Systematic Promotion Re-Enrollment |
| 123 – Puerto Rico Annual IMEI Clean Up | 5 – Back Office > 6 – Data Integrity > 3 – Data Clean Up (Source) |
| 124 – MSISDN Clean Up Automated Process | 3 – Servicing > 1 – Device Financing Product Redemption > 1 – JUMP 1.0 |
| | 3 – Servicing > 1 – Device Financing Product Redemption > 2 – JUMP 2.0 |
| | 3 – Servicing > 1 – Device Financing Product Redemption > 3 – JUMP 3.0 (Motts) |
| | 3 – Servicing > 11 – View Financing Details > 2 – Equipment Details |
| | 3 – Servicing > 12 – Insurance Claim > 1 – Damaged Device Claim |
| 125 – Temporary Double Visual Audit | 1 – Presale > 7 – Credit Request > 4 – Check ECA for Financed Amount |
| | 1 – Presale > 7 – Credit Request > 5 – ECL Temporary Increase (Temp Double) |
| 130 – Policy Adherence Meeting (PARM) | 1 – Presale > 7 – Credit Request > 5 – ECL Temporary Increase (Temp Double) |

IT Domain to Control

| Domain ID | ID – Control Name | ID – Control Name | Controls | Issues | Processes |
|---|---|---|---|---|---|
| Billing and Charging Management | | 2.2.1 – Origination/Creation(L1) Document Management(L2) Generation/.. | 0 | 1 | 1 |
| | | 3.1.3 – Servicing(L1) Device Financing Product Redemption(L2) JUMP 3.0 | 0 | 0 | 1 |
| | | 3.4.4 – Servicing(L1) Financing Modification(L2) MSISDN Update(L3) | 0 | 0 | 1 |
| | 124 – MSISDN Clean Up Automated Process | 3.1.3 – Servicing(L1) Device Financing Product Redemption(L2) JUMP 3.0 | 1 | 0 | 1 |
| | 179 – T-Mobile Trucks Change Store Business ... | 2.2.1 – Origination/Creation(L1) Document Management(L2) Generation/.. | 1 | 1 | 1 |
| | 308 – FinCo Operations Tax Presentation Testing | 2.2.1 – Origination/Creation(L1) Document Management(L2) Generation/.. | 1 | 1 | 1 |
| | 333 – Weekly One & Only Team Mtg Approvals | 3.1.3 – Servicing(L1) Device Financing Product Redemption(L2) JUMP 3.0 | 1 | 0 | 1 |
| | 342 – FinCo Testing of Agreements | 3.1.3 – Servicing(L1) Device Financing Product Redemption(L2) JUMP 3.0 | 1 | 0 | 1 |
| | 451 – IT – Systemic Removal of Permanent ECL... | 1.7.6 – Presale(L1) Credit Request(L2) ECL Permanent Increase(L3) | 1 | 0 | 1 |
| | Total | | 6 | 4 | 4 |
| Channel Partner Relationship Management | | 2.1.2 – Origination/Creation(L1) Tender/Check Out(L2) Trade-In Disposit.. | 0 | 1 | 1 |
| | | 2.3.1 – Origination/Creation(L1) Fulfillment(L2) In Store Fulfillment Proce... | 0 | 0 | 1 |
| | | 3.2.2 – Servicing(L1) Billing(L2) Charge Presentation on Bill(L3) | 0 | 0 | 1 |
| | 329 – Systemic Prevention of Incorrect Amount Due | 3.2.2 – Servicing(L1) Billing(L2) Charge Presentation on Bill(L3) | 1 | 0 | 1 |
| | 340 – Produce Bill for Account Permission | 3.2.2 – Servicing(L1) Billing(L2) Charge Presentation on Bill(L3) | 1 | 0 | 1 |
| | 342 – FinCo Testing of Agreements | 2.1.2 – Origination/Creation(L1) Tender/Check Out(L2) Trade-In Disposit.. | 1 | 1 | 1 |
| | Total | | 3 | 1 | 3 |
| Commerce | | 2.1.3 – Origination/Creation(L1) Tender/Check Out(L2) Payment Method... | 0 | 0 | 1 |
| | | 2.1.4 – Origination/Creation(L1) Tender/Check Out(L2) Commit ECA fro... | 0 | 0 | 1 |
| | | 3.2.9 – Servicing(L1) Billing(L2) Manual Plan Credit/Adjustment(L3) | 0 | 0 | 1 |
| | | 3.3.1 – Servicing(L1) Payment(L2) Make Scheduled Equipment Financ... | 0 | 0 | 1 |
| | 6 – NSEiP Manual Adjustment Prevention | 3.2.9 – Servicing(L1) Billing(L2) Manual Plan Credit/Adjustment(L3) | 1 | 0 | 1 |
| | 87 – Systemic PostVoid of Sale | 2.1.3 – Origination/Creation(L1) Tender/Check Out(L2) Payment Method... | 1 | 0 | 1 |
| | 172 – FinCo Risk Based on Monitoring Temp Do... | 2.1.4 – Origination/Creation(L1) Tender/Check Out(L2) Commit ECA fro... | 1 | 0 | 1 |
| | 308 – FinCo Operations Tax Presentation Testing | 2.1.3 – Origination/Creation(L1) Tender/Check Out(L2) Payment Method... | 1 | 0 | 1 |
| | 327 – Adjustment Visual Audit | 3.2.9 – Servicing(L1) Billing(L2) Manual Plan Credit/Adjustment(L3) | 1 | 0 | 1 |
| | 342 – FinCo Testing of Agreements | 2.1.3 – Origination/Creation(L1) Tender/Check Out(L2) Payment Method... | 1 | 0 | 1 |
| | 421 – Self service origination - taxation | 2.1.3 – Origination/Creation(L1) Tender/Check Out(L2) Payment Method... | 1 | 0 | 1 |
| | Total | | 7 | 0 | 4 |
| Compliance and R | | 2.2.5 – Origination/Creation(L1) Document Management(L2) Storage of... | 0 | 0 | 1 |

| Total Regulations 1102 | Total Controls 1104 | Total Processes 1106 |
|---|---|---|
| 6 | 83 | 169 |

Regulation-to-Control

| Regulation(s) | ID – Control Name | Processes (Level 1 – 3) 1108 | Issues |
|---|---|---|---|
| , ADA, ECOA, E-Sign, FCRA/FACTA, MLA, Puerto Rico Specific, Reg M/CLA, Reg P, SCRA, TILA, UDAAP, Other State Specific Reg. | 342 – FinCo Testing of Agreements | 1 – Presale > 7 – Credit Request > 2 – Optional Additional Down Payment | 0 |
| | | 2 – Origination/Creation > 1 – Tender/Check Out > 2 – Trade-In Deposit... | 1 |
| | | 2 – Origination/Creation > 1 – Tender/Check Out > 2 – Payment Method... | 0 |
| | | 2 – Origination/Creation > 2 – Document Management > 3 – Manual For... | 0 |
| | | 2 – Origination/Creation > 2 – Document Management > 5 – Storage of... | 0 |
| | | 2 – Origination/Creation > 2 – Document Management > 9 – Signature C... | 1 |
| | | 2 – Origination/Creation > 4 – Create Installation Plan in System > 7 – C... | 1 |
| | | 3 – Servicing > 1 – Device Financing Product Redemption > 1 – JUMP 1.0 | 1 |
| | | 3 – Servicing > 1 – Device Financing Product Redemption > 2 – JUMP 2.0 | 0 |
| | | 3 – Servicing > 1 – Device Financing Product Redemption > 3 – JUMP 3.0 | 0 |
| | | 5 – Back Office > 3 – FinCo Operations > 4 – Production Issue Manage... | 1 |
| | | 5 – Back Office > 3 – FinCo Operations > 5 – New Initiative Management | 0 |
| , CAN-SPAM | 286 – Do Not Contact Compliance | 1 – Presale > 2 – Advertising > 4 – Outbound Call Campaign | 0 |
| , E-Sign, Reg M/CLA, TILA, Record ... | 414 – Retail Store EOD Process – Wet Signature | 2 – Origination/Creation > 2 – Document Management > 9 – Signature C... | 1 |
| , E-Sign, TILA, | 401 – Business Snail Mail Agreement Recon | 2 – Origination/Creation > 2 – Document Management > 2 – Customer ... | 0 |
| | 420 – Snail Mail agreement upon email failure | 2 – Origination/Creation > 2 – Document Management > 2 – Customer ... | 0 |
| , E-Sign, TILA, Reg M/CLA, Record ... | 417 – FBC RBM Automated Alert Validation | 5 – Back Office > 3 – FinCo Operations > 2 – Controls | 0 |
| , ECOA, | 400 – Retail Merchandising Compliance | 1 – Presale > 2 – Advertising > 1 – Legal Disclaimer | 0 |
| | | 1 – Presale > 5 – Risk Based Pricing > 2 – Pricing Cards (Retail, Web, etc) | 0 |
| | | 1 – Presale > 5 – Risk Based Pricing > 3 – In Store Collateral | 0 |
| | 403 – Documentation for Configured Down Payment Approved Changes | 1 – Presale > 5 – Risk Based Pricing > 5 – CRP Table Configuration | 1 |
| | 409 – CRP Update Ticket Process for ASM MW | 1 – Presale > 5 – Risk Based Pricing > 6 – Pricing (COOP/TOOP) Table... | 0 |
| , ECOA, Pending FinCo Compliance... | 403 – Documentation for Configured Down Pay... | 1 – Presale > 5 – Risk Based Pricing > 5 – CRP Table Configuration | 1 |
| | | 1 – Presale > 2 – Advertising > 1 – Legal Disclaimer | 0 |
| | | 1 – Presale > 7 – Credit Request > 3 – Finalize Financing Details | 0 |
| , ECOA, UDAAP, | 409 – CRP Update Ticket Process for ASM MW | 1 – Presale > 7 – Credit Request > 4 – Check ECA for Financed Amounts | 0 |

*FIG. 11*

1200

| Control Name | Processes (Level 1 – 3) | Day of Implementation Date | Risk Assessment |
|---|---|---|---|
| 87 – Systemic PostVoid of Sale | 2 – Origination/Creation > 1 – Tender/Check Out > 3 – Payment Method (Tender) | December 31, 2017 | 22 |
| 125 – Temporary Double Visual Audit | 1 – Presale > 7 – Credit Request > 4 – Check ECA for Financed Amount | December 31, 2017 | 17 |
| | 1 – Presale > 7 – Credit Request > 5 – ECL Temporary Increase (Temp Double) | December 31, 2017 | 17 |
| 414 – Retail Store EOD Process – Wet Signature | 2 – Origination/Creation > 2 – Document Management > 9 – Signature Capture | December 31, 2016 | 16 |
| 172 – FinCo Risk Based Monitoring Temp Double | 1 – Presale > 7 – Credit Request > 3 – Finalize Financing Details | May 31, 2017 | 15 |
| | 1 – Presale > 7 – Credit Request > 4 – Check ECA for Financed Amount | May 31, 2017 | 15 |
| | 1 – Presale > 7 – Credit Request > 5 – ECL Temporary Increase (Temp Double) | May 31, 2017 | 15 |
| | 2 – Origination/Creation > 1 – Tender/Check Out > 4 – Commit ECA from ECB | May 31, 2017 | 15 |
| | 2 – Origination/Creation > 4 – Create Installation Plan in System > 7 – Create Installme... | May 31, 2017 | 15 |
| 269 – Risk Based Monitoring OpenText Ingestion Monitor | 2 – Origination/Creation > 2 – Document Management > 5 – Storage of Accepted Docu... | December 31, 2017 | 15 |
| | 2 – Origination/Creation > 4 – Create Installation Plan in System > 7 – Create Installme... | December 31, 2017 | 15 |
| 302 – Promotions Feasibility and Impact Assessments | 3 – Servicing > 13 – Promotions > 1 – Systematic Promotion Enrollment | June 29, 2017 | 15 |
| | 3 – Servicing > 13 – Promotions > 2 – Systematic Promotion Unenrollment | June 29, 2017 | 15 |
| | 3 – Servicing > 13 – Promotions > 3 – Systematic Promotion Re-Enrollment | June 29, 2017 | 15 |
| | 3 – Servicing > 13 – Promotions > 4 – Manual Promotion Enrollment (PEW) | June 29, 2017 | 15 |
| | 3 – Servicing > 13 – Promotions > 5 – Manual Promotion Unenrollment (PEW) | June 29, 2017 | 15 |
| | 3 – Servicing > 13 – Promotions > 6 – View Promotion Details | June 29, 2017 | 15 |
| 342 – FinCo Testing of Agreements | 1 – Presale > 7 – Credit Request > 2 – Optional Additional Down Payment | December 31, 2016 | 15 |
| | 2 – Origination/Creation > 1 – Tender/Check Out > 2 – Trade-In Disposition – Accept In... | December 31, 2016 | 15 |
| | 2 – Origination/Creation > 1 – Tender/Check Out > 3 – Payment Method (Tender) | December 31, 2016 | 15 |
| | 2 – Origination/Creation > 2 – Document Management > 3 – Manual Forms (i.e. Retail ... | December 31, 2016 | 15 |

*FIG. 12*

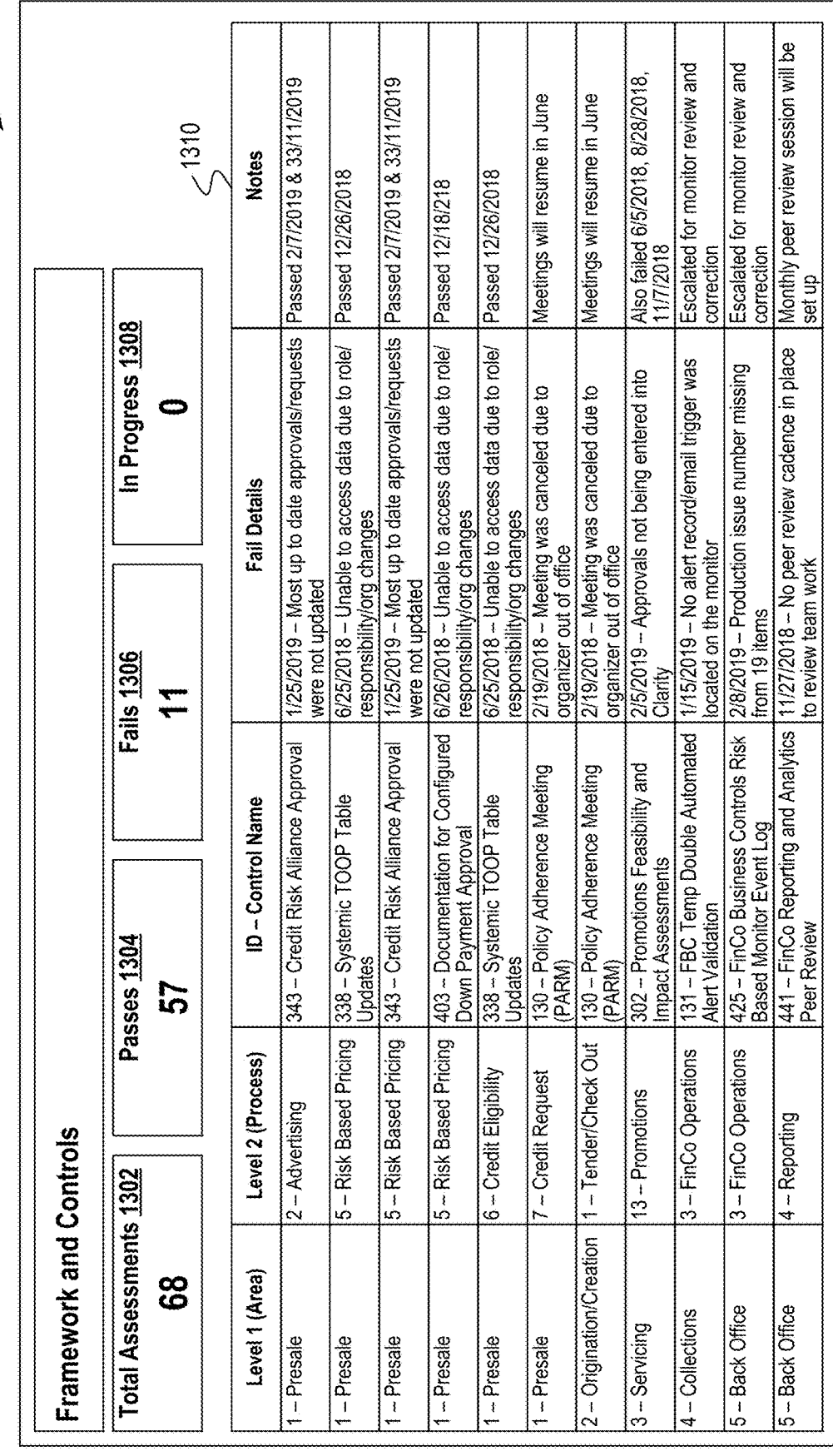

Framework and Controls 1300

| Total Assessments 1302 | Passes 1304 | Fails 1306 | In Progress 1308 |
|---|---|---|---|
| 68 | 57 | 11 | 0 |

| Level 1 (Area) | Level 2 (Process) | ID – Control Name | Fail Details | Notes |
|---|---|---|---|---|
| 1 – Presale | 2 – Advertising | 343 – Credit Risk Alliance Approval | 1/25/2019 – Most up to date approvals/requests were not updated | Passed 2/7/2019 & 33/11/2019 |
| 1 – Presale | 5 – Risk Based Pricing | 338 – Systemic TOOP Table Updates | 6/25/2018 – Unable to access data due to role/ responsibility/org changes | Passed 12/26/2018 |
| 1 – Presale | 5 – Risk Based Pricing | 343 – Credit Risk Alliance Approval | 1/25/2019 – Most up to date approvals/requests were not updated | Passed 2/7/2019 & 33/11/2019 |
| 1 – Presale | 5 – Risk Based Pricing | 403 – Documentation for Configured Down Payment Approval | 6/26/2018 – Unable to access data due to role/ responsibility/org changes | Passed 12/18/218 |
| 1 – Presale | 6 – Credit Eligibility | 338 – Systemic TOOP Table Updates | 6/25/2018 – Unable to access data due to role/ responsibility/org changes | Passed 12/26/2018 |
| 1 – Presale | 7 – Credit Request | 130 – Policy Adherence Meeting (PARM) | 2/19/2018 – Meeting was canceled due to organizer out of office | Meetings will resume in June |
| 2 – Origination/Creation | 1 – Tender/Check Out | 130 – Policy Adherence Meeting (PARM) | 2/19/2018 – Meeting was canceled due to organizer out of office | Meetings will resume in June |
| 3 – Servicing | 13 – Promotions | 302 – Promotions Feasibility and Impact Assessments | 2/5/2019 – Approvals not being entered into Clarity | Also failed 6/5/2018, 8/28/2018, 11/7/2018 |
| 4 – Collections | 3 – FinCo Operations | 131 – FBC Temp Double Automated Alert Validation | 1/15/2019 – No alert record/email trigger was located on the monitor | Escalated for monitor review and correction |
| 5 – Back Office | 3 – FinCo Operations | 425 – FinCo Business Controls Risk Based Monitor Event Log | 2/8/2019 – Production issue number missing from 19 items | Escalated for monitor review and correction |
| 5 – Back Office | 4 – Reporting | 441 – FinCo Reporting and Analytics Peer Review | 11/27/2018 – No peer review cadence in place to review team work | Monthly peer review session will be set up |

AUTOMATED FRAMEWORK FOR MANAGING PROCESS CONTROLS TO IMPROVE SYSTEM PERFORMANCE

CROSS-REFERENCE TO RELATED APPLICATIONS

This application is a continuation of U.S. patent application Ser. No. 16/803,796, filed on Feb. 27, 2020 (now issued as U.S. Pat. No. 11,720,684), entitled AUTOMATED FRAMEWORK FOR MANAGING PROCESS CONTROLS TO IMPROVE SYSTEM PERFORMANCE, which is hereby incorporated by reference in its entirety.

BACKGROUND

Modern organizations include disparate systems and subsystems that are part of operate various processes. For example, an automated manufacturing system can include subsystems that perform processes for casting, molding, machining, labeling and painting. Each process can include computer-implemented controls used to monitor compliance with different policies or standards. Typically, different subsystems deploy seemingly independent controls on the same process or fail to adequately control a process. As such, a process can get "over-controlled" or "under-controlled." The former stifles process completion due to compliance bottlenecks and the latter results in faulty outputs, creates security risks, or results in data corruption. Both scenarios lead to poor system performance.

In another example, an organization can implement a corporate governance, risk, and compliance (GRC) program to monitor compliance with regulations. With computer automation of GRC programs, organizations can reduce risk while achieving operational efficiencies. RSA Archer is an example of a GRC automation tool that an organization can use to monitor controls. RSA Archer has tools that limit organizational risk related to regulatory compliance, third-party relationships, and security threats. These tools can implement GRC operations through automation and staff collaboration to reduce risk and staff time required to identify and remedy noncompliance.

However, existing tools lack visibility into the structure, function, and relative scope of controls across an organization. This is particularly problematic because an organization runs different controls to ensure compliance with different policies. Moreover, each control has a different owner in the organization, and any process can have multiple controls with different owners or no controls. Each owner is responsible for addressing noncompliance of the owner's controls and, as a result, controls are not managed uniformly across an organization.

BRIEF DESCRIPTION OF THE DRAWINGS

Embodiments or implementations of the present technology will be described and explained through the use of the accompanying drawings.

FIG. 8 illustrates an example of detailed information that includes a reference to policies and procedures related to a control, process, or other feature of the framework.

FIG. 9 illustrates an interface view that maps controls to any related processes at different levels of the framework.

FIG. 10 illustrates an interface view that maps IT controls to business units.

FIG. 11 illustrates an interface view that maps regulations to controls.

FIG. 12 illustrates an interface view for tracking controls of the framework.

FIG. 13 illustrates an interface view that shows assessments of a controls.

Figure 1:
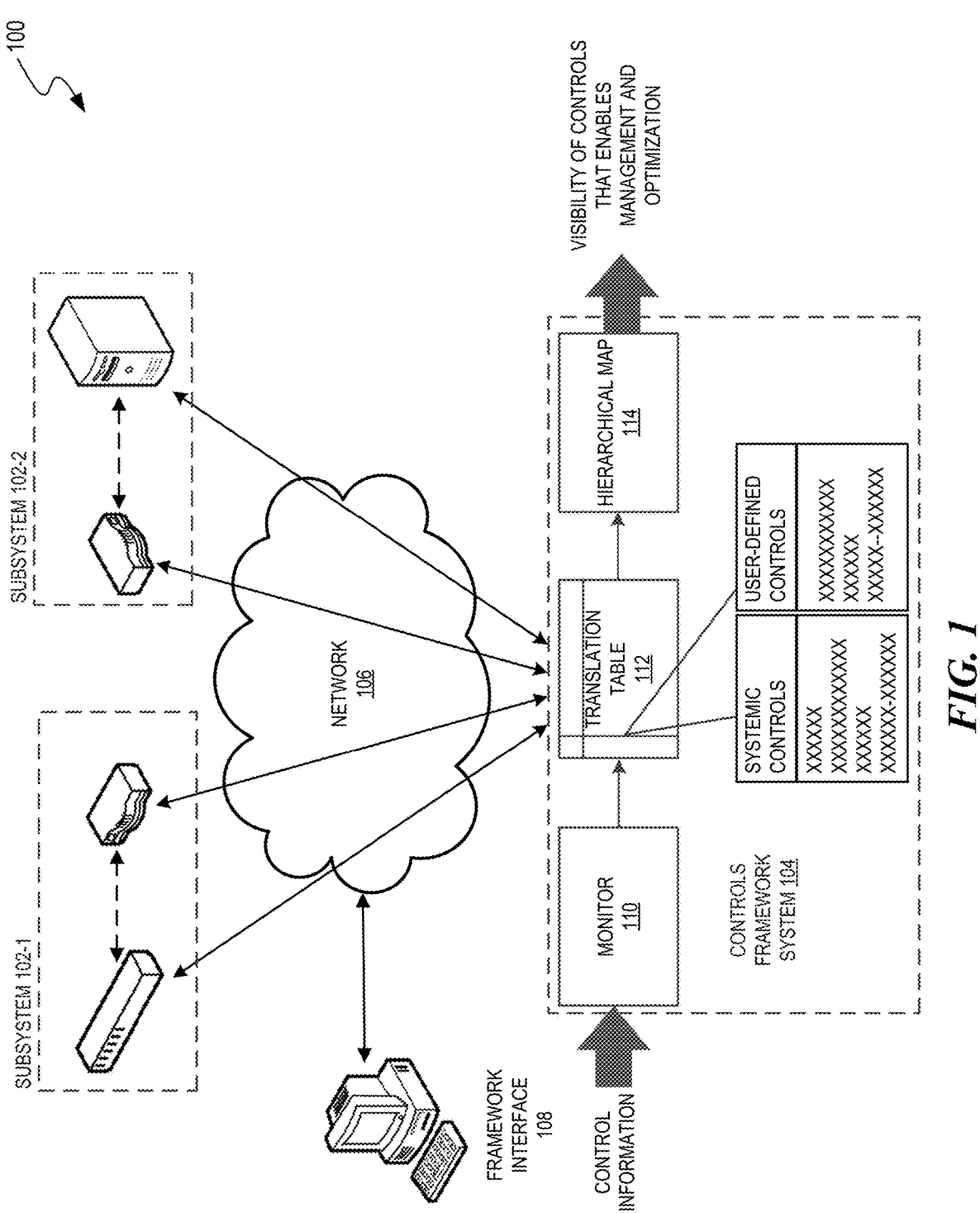
FIG. 1 is a system diagram that illustrates a controls framework ("framework") in the context of an organization's system.

The drawings, some components and/or operations can be separated into different blocks or combined into a single block when discussing some embodiments or implementations of the present technology. Moreover, while the technology is amenable to various modifications and alternative forms, specific implementations have been shown by way of example in the drawings and are described in detail below. The intention, however, is not to limit the technology to the particular implementations described herein. On the contrary, the technology is intended to cover all modifications, equivalents, and alternatives falling within the scope of the technology as defined by the appended claims.

DETAILED DESCRIPTION

The disclosed system includes a computer-implemented controls framework ("framework"), which provides visibility into controls including a number, type, and distribution of controls deployed on processes across areas (e.g., subsystems) of an organization. As such, users can troubleshoot any detected issues by adjusting the number, type, and distribution of controls thereby improving performance of an entire system while ensuring compliance. For example, the framework can detect a process that is over-controlled with multiple controls, which could inhibit process completion due to compliance bottlenecks. The framework can also detect an under-controlled process, which can expose that process or an entire organization to faults, security risks, or data corruption. In addition, the framework provides a portal that can expose information indicative of improperly controlled processes so that users can address poor performance (or the possibility thereof). As such, the framework can provide contextual insights of risk and effects of noncompliance across areas of an organization through a common portal.

The framework can provide visibility into controls data that originated from different subsystems that use different nomenclature and use different data structures. For example, the same process may have an operational control and an IT control. The IT control may be located at an interface between two subsystems and have a systemic scope in that the IT control checks to make sure that all data passed between the two subsystems is not altered. That is, the data remains accurate when moving from one subsystem to another. On the other hand, a user-defined control (e.g., customized control) can be located at the same interface but only meant to check that one particular data type (e.g., social security numbers) remains unaltered. Hence, the user-defined control is redundant (i.e., duplicative) of the systemic control. However, the owner of the IT control only has visibility of IT controls while the owner of the user-defined control only has visibility of the user-defined control. Without the disclosed framework, controls seem independent to respective owners and to the entire organization. Hence, the framework provides visibility into different controls across areas of an organization to optimize control of processes and ultimately improve system performance by, for example, avoiding bottlenecks and security risks.

In one example, a manufacturing process for a type of widget by an organization is constrained by regulatory requirements for ISO 9000, which is a set of standards that helps organizations ensure they meet customer and other stakeholder needs within statutory and regulatory requirements related to a product or service. One or more threshold controls can monitor for failure or non-compliance of the manufacturing of the widgets where there are regulatory requirements for ISO 9000. For example, one control can monitor the process for a particular customer and another control can monitor the process to check compliance with the organization's quality standards.

The disclosed technology provides a centralized view for all controls of the manufacturing process in order to provide visibility into whether, for example, the organization's standards could be raised or lowered while still satisfying the majority of the customer's requirements. This allows for both the operational and regulatory requirements to be rationalized, and assists in sharing information about issues that could be impacting both operational and regulatory adherence. Further, a number of controls that are implemented by various groups (e.g., different owners) on the same manufacturing process can have different purviews, and each control has an associated cost. The disclosed framework can enable reducing that number of controls by harmonizing the views to thereby reduce overhead while managing risk; hence, this manufacturing implementation provides a competitive advantage over an organization that does not deploy the framework.

Various embodiments and implementations of the disclosed framework include systems and methods described herein. This description provides specific details for a thorough understanding and an enabling description of these implementations. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific implementations of the invention.

Although not required, implementations are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or 4mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed implementations, such as certain functions of the framework, can be performed exclusively or primarily on a single device, some implementations can also be practiced in distributed environments where functions or modules are shared among disparate processing devices, which are linked through a communications network, such as a local area network (LAN), wide area network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some implementations, computer implemented instructions, data structures, screen displays, and other data under aspects of the invention can be distributed over the Internet or over other networks (including wireless networks), on a propagated signal on a propagation medium (e.g., an electromagnetic wave(s), a sound wave) over a period of time, or they can be provided on any analog or digital network (e.g., packet switched, circuit switched, or other scheme).

FIG. 1 depicts an example of an organization's system 100 ("system 100") including subsystems 102-1 and 102-2 (referred to collectively as "subsystems 102") of areas of the system 100. The subsystems 102 have processes with controls to monitor compliance with rules, policies, etc. Hence, each of the subsystems 102 represents a source of control information, including particular controls (e.g., type, number, scope) of particular processes and associated owners. The subsystems 102 are operable to communicate the control information over the network 106 to a controls framework 104 ("framework 104"). A framework interface 108 (e.g., desktop computer system) is coupled to the subsystems 102 and the framework 104 via the network 106. In another example, the framework interface 108 is coupled directly to any component of the system 100 that can access the framework 104.

The framework 104 can include one or more computing devices (e.g., server computers) with a memory that stores instructions that, when executed by a processor, cause the framework 104 to ingest and translate control information used to create a hierarchical map that enables visibility of controls across the system 104. The components of the framework 104 can include any combination of hardware and/or software. For example, a monitor 110 can be a device with ports that ingests the control information of the subsystems 102 (and any other subsystems) and a translation table 112 can translate the ingested control information to resolve relationships among controls. The relationships among the translated controls information is used to form a hierarchical map 114 of the areas, processes, sub-processes, and associated controls of the system 100. In some implementations, the framework 104 is coupled to different tools (not shown) that add functions such as filtering capabilities.

As such, the framework 104 enables visibility of processes and associated controls across the system 100 via the framework interface 108.

The framework 104 enables optimal compliance across different areas of an organization. In some embodiments, an area is a functional component of the system such as a subsystem that is managed independently from the other areas of the organization. The framework 104 can identify risks related to controls that seem independent, determine their scope and relationships across areas of an organization, and communicate risks through framework interface 108 for any users. Thus, the framework 104 can improve the performance of the system 100 by eliminating compliance bottlenecks and safeguarding the system against risk with an appropriate degree of control. This improves over prior systems that use different tools to monitor compliance of processes with controls of respective owners.

The framework 104 builds the organization-wide hierarchical map 114 to reflect an arrangement that facilitates uniform monitoring of different controls associated with different processes. In some implementations, the hierarchical arrangement has processes at different levels to collectively define an environment including various subsystems. The hierarchical arrangement implicitly prioritizes processes to provide relative degrees of control by the framework. In one example, the framework has multiple control areas at a first level, where each area can define processes at a second level, sub-processes at a third level, etc. The processes and/or sub-processes (collectively referred to herein as "processes") can be associated with particular control(s). This structure provides organization-wide insights into noncompliance, and performance issues or potential risk due to processes being over-controlled or under-controlled. Further, the framework 104 includes the framework interface 108 to display different views including graphical representations of the system 100. For example, the framework interface 108 can display, on a display device, a graphical map including a topology of processes mapped to rules, which are hyperlinked to controls.

More specifically, the framework monitors the existence and performance (or lack thereof) of controls to ensure compliance, such as around financial products, which are highly regulated (e.g., thousands of compliance requirements). The "controls" are designed to mitigate the occurrence of noncompliance. A process can be constrained by controls that monitor compliance with regulations, policies, procedures, contractual obligations, or guidelines. For example, a financial process is heavily regulated, and the system must control the process to ensure compliance by the organization. A conventional tool is specialized to address the management of one or a few related controls. Given that different areas of an organization deploy controls on different processes, multiple specialized software packages are deployed and independently controlled despite the technical (e.g., processing, load) burden on the system.

The disclosed framework is a solution that provides visibility into controls on processes and their relationship to other processes in the system to enable optimized control. As such, the framework can uniformly manage controls of an organization across numerous domains (financial, privacy-related, etc.), which is otherwise complex and burdensome to do with different software tools. Moreover, the visibility of the framework can facilitate monitoring risks, determining the scope of risks, and communicating risk to administrators via a framework interface.

The framework can assess the progress of a process in relation to controls. As used herein, a "process lifecycle"

may refer to a manner of assessing a process in the context of an initial, maturing, and final stages. By analyzing processes in this manner, the framework can determine how a particular process fits in the hierarchical arrangement of processes, as well as how the particular process changes as it matures within an organization. This manner of analysis is analogous to systems analysis, which is a technique for estimating or inferring how local policies, actions, or changes influence the state of a larger system. Hence, this approach to problem-solving views "problems" as parts of the overall system, rather than reacting to particular outcomes and potentially contributing to further development of an undesired issue or problem. The framework creates a structure where component parts (e.g., areas, processes, sub-processes) of the system are analyzed in relationships among the component parts and subsystems. Hence, the framework enables a user to fully understand the root of a fault or why a fault persists, and to understand a component of the organization in relation to the whole organization.

To analyze the effects of controls (or lack thereof) in the context of an organization's entire system, the framework identifies linkages among component parts and defines the system environment in a hierarchical structure of a finite set of processes associated with controls. In some embodiments, the processes are prioritized in accordance with the hierarchical structure to provide relative degrees of control. For example, a lower-level process can be controlled by a single control. A higher-level process is associated with more than one lower-level process and, as such, the higher-level process can be controlled by more than one control. Hence, the disclosed technology can reduce a complex operational environment into the hierarchy of levels.

In some embodiments, the framework can define multiple areas of process lifecycles. For example, an area can be at a first level of a hierarchical structure. The areas can include a process at a second level, and each process can include sub-processes at a third level. Each of the sub-processes can be associated with respective controls that are monitored for effective compliance. The status of the controls and compliance can be communicated via the framework interface on computing devices for users. That is, a user can access the framework through the framework interface, which includes graphical elements for navigating through representations of areas of the organization's system. An example of a graphical element includes a graphical element showing processes mapped to policies and procedures, which are hyperlinked to controls.

The implementation including a hierarchical arrangement and common interface reduce the technological burden on an organization by eliminating the need to run different tools for different controls or processes. Moreover, the framework reduces the cognitive burden on users by avoiding the need to search through different systems of the organization to troubleshoot and analyze controls and compliance. Instead, for example, if a control fails, the framework can display, on the framework interface, a graphic that identifies all processes impacted by that failure. In some embodiments, the framework maps controls in one domain (e.g., business units) with controls in another domain (e.g., IT units) to enable uniform visibility to controls through a common resource. Thus, a user can readily determine whether an organization is over-controlling a process and therefore wasting resources and creating compliance bottlenecks or under-controlling a process and therefore increasing risk. Hence, the framework helps to identify whether controls are performing as expected with as much efficiency as possible by balancing resource utilization against risk.

The disclosed framework can implement best practices for a controlled environment. For example, a controlled environment can be based on standards issued by the Committee of Sponsoring Organizations (COSO). The standards can be used by the framework to create a comprehensive hierarchy and guidance for user-defined controls directed at addressing enterprise risk, fraud deterrence to improve organizational performance and oversight, and to reduce the extent of fraud in an organization.

The framework can implement components or modules that collectively provide a controlled environment to address risk assessment, control activities, provide information and communication, and evaluating, monitoring, or assessment of controls. For example, a control environment component can implement standards, processes, or structures that control aspects of an organization (e.g., set by administrators). The controls can monitor assignments of authority and ownership, staffing and maintaining individual competencies and/or performance measures that drive accountability from part of the control environment. A risk assessment component of the framework can provide dynamic and/or iterative identification and assessment of controlled processes. A risk assessment can address risk appetite and tolerances, risk objectives, and management of non-value add or ineffective controls. A control activities component can include policies and procedures, preventative and detective processes, other processes and technology, or segregation of duties. An information and communication component can include communications across different areas of an organization (e.g., up, down, across) and messages about controls relative to expectations. An evaluation component can enable providing timely information, can be built into a broader organization system and operate periodically, can be tailored for a preset risk level, can incorporate measurements against standards and regulations, and evaluate communications deficiencies.

Figure 2:
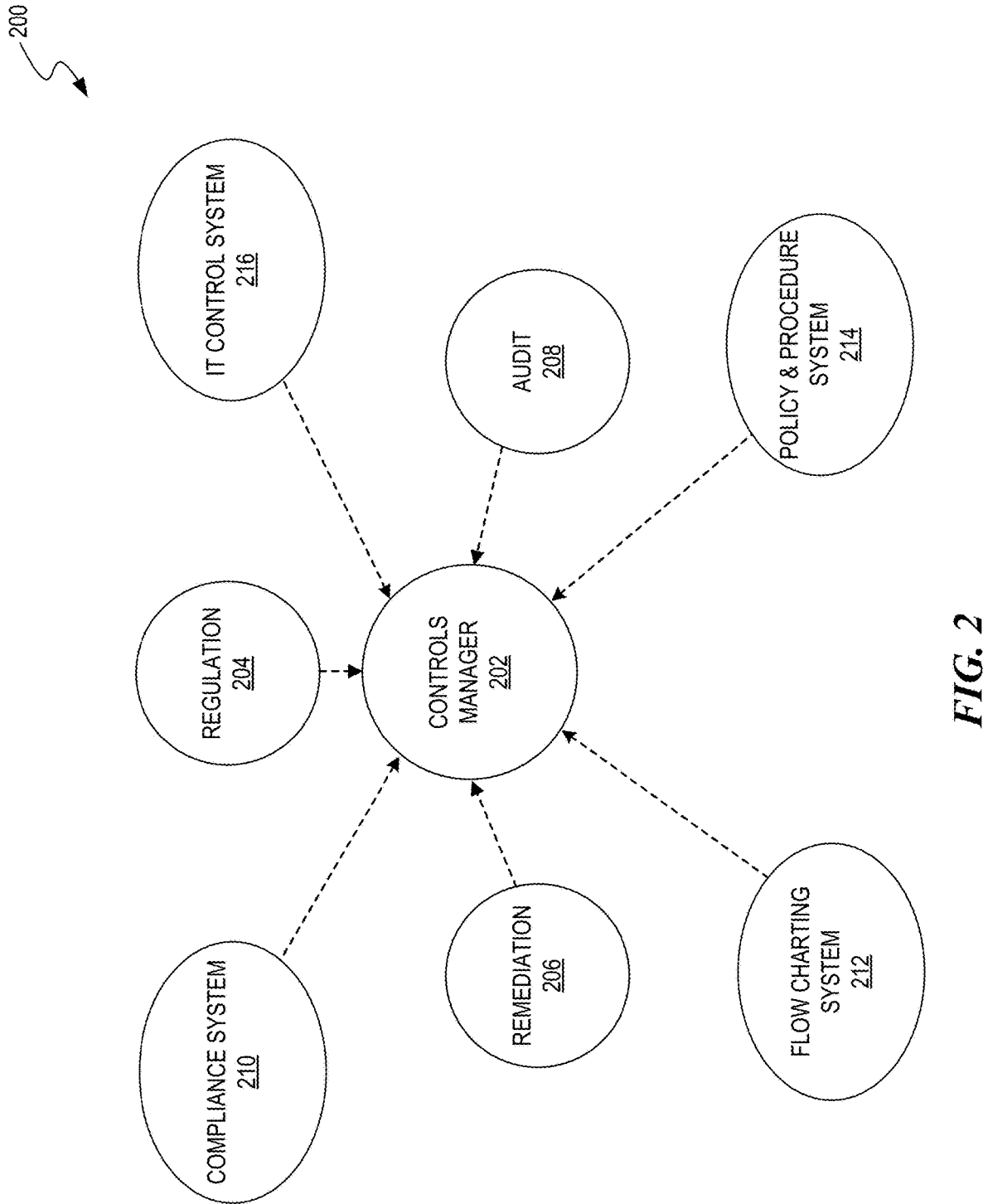
FIG. 2 is a block diagram that illustrates a representation of a controls manager used to harmonize controls of different source subsystems.

FIG. 2 is a block diagram that illustrates a representation 200 of a controls manager 202 that can harmonize controls implemented in different subsystems. The controls manager 202 ingests controls information of various source subsystems. As shown, the example subsystem sources of the controls information include a remediation 206 subsystem, an audit 208 subsystem, a compliance system 210, a flow-charting subsystem 212, a policy and procedure subsystem 214, and/or an IT control system 216.

The controls information of the various source subsystems can use different data structures, data formats, or use different nomenclature. The controls manager 202 can convert the controls information into a common format. As such, the framework can use a common language to manage the controls of the various source subsystems. The controls manager 202 can form linkages between related controls. For example, a systemic control can be linked to user-defined controls that act on the same process with scopes that may overlap. In particular, a systemic IT control at an interface between two subsystems can check that the data passed between the two subsystems remains unaltered. A user-defined control may act on the same process to check that a particular data passed between the two subsystems remains unaltered. Hence, the framework would link the systemic IT control with the user-defined control and enable visibility of that relationship via the framework interface.

Therefore, the framework is enabled by the controls manager 202 to enforce and/or monitor compliance with different policies, criteria, rules, etcetera of different subsystems in an organization. In this arrangement, the controls manager 202 can also aid in compliance by the subsystems with, for example, periodic feedback regarding the state of a control and compliance with processes related to regulation, remediation, audit, and other subsystems. As such, this architecture offers a broad view of compliance with respect to relationships among subsystems.

Figure 3:
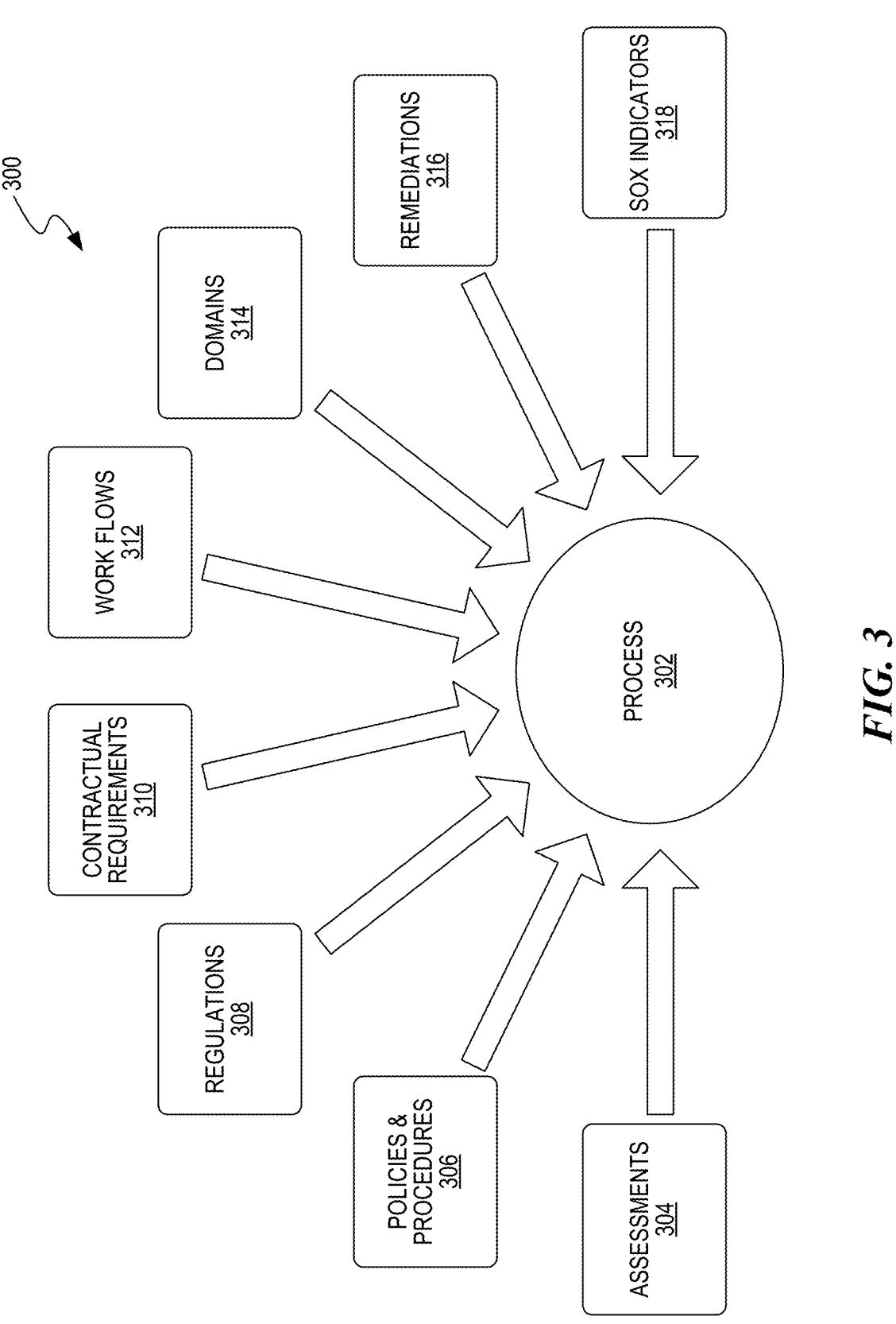
FIG. 3 is a block diagram that illustrates a process and associated controls.

FIG. 3 is a block diagram 300 that illustrates examples of different types of controls that can act on a process 302. As shown, the exemplary controls include assessments 304, policies and procedures 306, regulations 308, contractual requirements 310, workflows 312, IT domains 314, remediations 316, SOX indicators 318, etc. In general, the controls can be systemic with broad scopes that are predefined and not necessarily customizable or user-defined controls that are customized by a user.

The framework can harmonize management of the different controls into a common format to resolve relationships among controls and link related controls in a hierarchical structure. As a result, the framework can then monitor controls on processes to provide timely feedback about risk based on the controls (or lack thereof) that act on a process. For example, by forming linkages among controls and system component, a failure of any control can be reported to a user along with any downstream effects on other controls or components. Moreover, the framework can provide a holistic view of compliance that bridges, for example, different domains because it encompasses a variety of rules for various processes for several different systems. Further, the framework can provide a relational view of processes (e.g., both forwards and backwards) and compliance with respect to relationships relative to the process 302 and other processes that are subject to the same controls.

As previously indicated, the disclosed framework can implement a hierarchical arrangement with processes at multiple levels. In particular, one or more processes at one or more levels can be controlled independently or collectively by the framework. The processes can have a particular order and the framework can monitor the span of a process lifecycle. Higher-level processes can be associated with lower-level processes. For example, in the context of a financial service, a first level can include an ordered series of process areas including presale, originating, servicing, collections, and back-office areas. A first-level presale area is associated with one or more lower level processes. An example of a second-level process includes prescreening of a customer, and an associated third level process can include a disclaimer (e.g., legal disclaimer). Another example of a second-level process for the presale area is advertising. Examples of third-level processes for advertising include an advertising disclaimer, media marketing, or consumer-marketing mix. Yet another example of a second level process for the presale process is a risk-based pricing process. Examples of third-level processes for risk-based pricing include pricing cards and in-store collateral processes.

The framework can prioritize controls in accordance with a hierarchical map created for a system. For example, controls that are based on regulatory, operational, and systemic risks can be prioritized over other controls by acting on higher-level processes. The framework can also provide a centralized method of communicating risks to inform users the risks. Further, output can be customized for particular users or groups. The hierarchical map and associated interface of the framework system reduce the burden on operations. Moreover, the framework is agile because it can readily adapt to change across an organization from a central locus. That is, the framework could readily cause the entire system or any portion thereof to adopt changes in policies, procedures, rules, operations, services, or processes.

Figure 4:
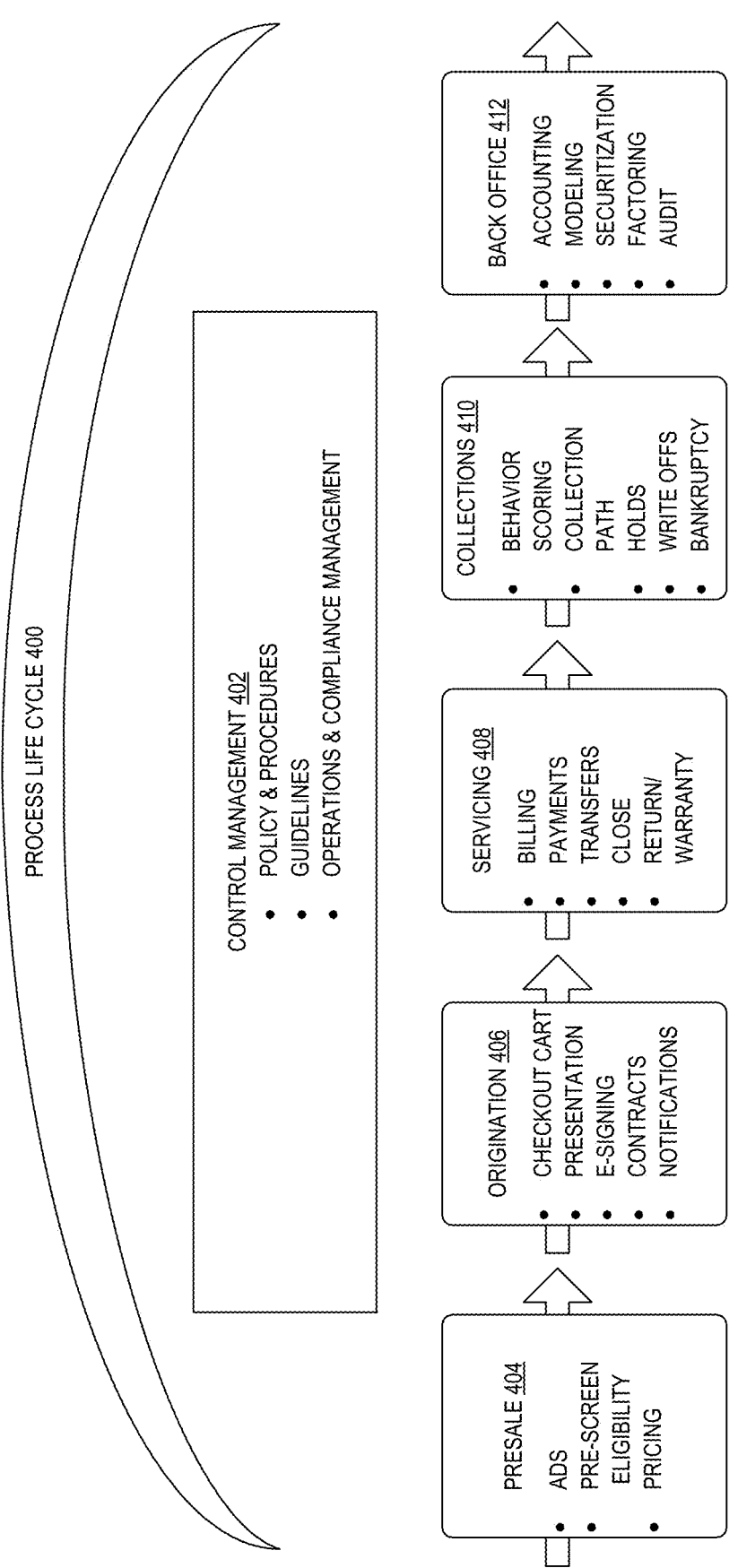
FIG. 4 is a block diagram that illustrates an example of a process lifecycle monitored by the framework.

FIG. 4 is a block diagram that illustrates an example of a process lifecycle 400 monitored by the framework. Any process lifecycle can include multiple complex systems that form an end-to-end cycle. For example, in consumer lending, in a telecommunications context, a process lifecycle can involve billions in annual sales that can include multiple channels using multiple phones, tablets, desktop computers, and other computing devices. The process lifecycle is subjected to various regulatory rules at both the federal and state level. Given the diversity and scope of the rules under 50 U.S. states, international considerations, and military vases, compliance by a consumer and business lending side of operations become burdensome.

As shown in FIG. 4, a control management component 402 of the process lifecycle 400 can include a controls translator and translation tables. The control management component 402 therefore manages overarching policies and procedures, guidelines, operations and compliance, etc. The areas of the process lifecycle 400 under the control management component 402 progress from left to right beginning at presale area 404. The presale area 404 can involve advertisements, prescreen eligibility of customers, and pricing arrangements. The origination area 406 can involve a checkout cart of a sale, presentation, e-signing of contracts, and notifications. The servicing area 408 can involve billing a client, receiving payments, transfers, closures, and issues related to returns/warranties. The collections area 410 can involve behavioral scoring, collection paths, holds, write-offs, and bankruptcies. The back-office area 412 can involve accounting, modeling, securitization, factoring, and audit procedures.

The control management component 402 can monitor controls for some or all of these areas or at interfaces between the areas. For example, systemic or user-defined controls at interfaces between areas can check to ensure that only accurate data moves between areas. The framework system can monitor a broad scope of controls and manage the controls using a common language. Hence, the framework can provide a single source for managing fragmented information and systems that could have various owners in a complex organizational environment. That is, administrators that are designated as owners of different controls can seamlessly use the same framework to monitor the different controls.

Although the implementations described herein include some examples of the framework in the context of certain services, one skilled in the art would understand that the disclosed techniques are applicable to any system that involves one or more processes that are subject to controls to ensure compliance.

Figure 5:
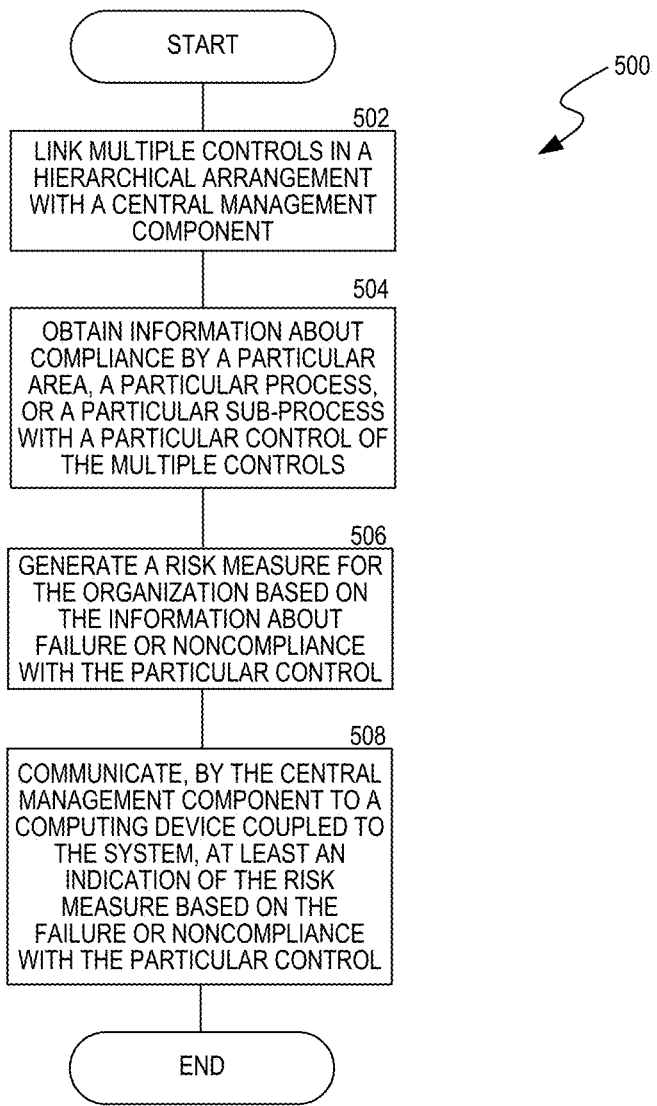
FIG. 5 is a flowchart that illustrates a method performed by the framework to monitor controls across areas and processes of an organization.

FIG. 5 is a flowchart that illustrates a method performed by the framework to manage controls across areas and processes of an organization. For example, the framework can manage and monitor multiple controls that act on multiple processes of an organization. An embodiment of the framework can include any number of server computers that facilitate access to controls from a computing device such as a handheld mobile device, a desktop computer, or a laptop computer.

In 502, the framework can link the multiple controls in a hierarchical arrangement with a central management component. Each control of the multiple controls can monitor compliance of a process relative to a rule. For example, a control can define a financial reporting schedule to monitor compliance by a financial operation of the organization with the financial reporting schedule. In some implementations, a control is user-defined for an individual user of the organization or provides system-wide control of the organization.

In some implementations, the hierarchical arrangement has a first level that defines areas of the multiple processes, a second level that defines a process of an area at the first level, and a third level that defines a sub-process of the process at the second level. Each sub-process is associated with a control of the multiple controls. In some implementations, the hierarchical arrangement defines a priority order such that control at a higher-level is prioritized over control at a lower-level of the hierarchical arrangement.

In 504, the framework can obtain information about compliance by a particular area, a particular process, or a particular sub-process with a particular control of the multiple controls. The information can indicate a failure or noncompliance with the particular control on at least a portion of the organization. In some embodiments, the information includes the location, number, and types of controls on at least a portion of the organization.

In 506, the framework can generate a risk measure (e.g., vulnerability) for the organization based on the information about failure or noncompliance with the particular control. In some implementations, the risk measure indicates an effect of noncompliance to an area other than an area subjected to the particular control, and the risk measure includes a scope of risk to the organization. In some implementations, the framework provides visibility into the locations, number, and types of controls that act on processes across the organization's system.

In 508, the framework can communicate, by the central management component to a computing device coupled to the framework, at least an indication of the risk measure based on the failure or noncompliance with the particular control. For example, the framework can display on an interface view of the computing system an indication of the risk measure.

In some implementations, one or more server computers can administer a portal that is accessible over a network by an end user on a mobile app or website. The portal can be administered by the server computers to cause display of the framework interface on a display device. The framework interface can include one or more views to receive input and display output of the framework, and/or disseminate related content or alerts as shown in FIGS. 6 through 14

Figure 6:
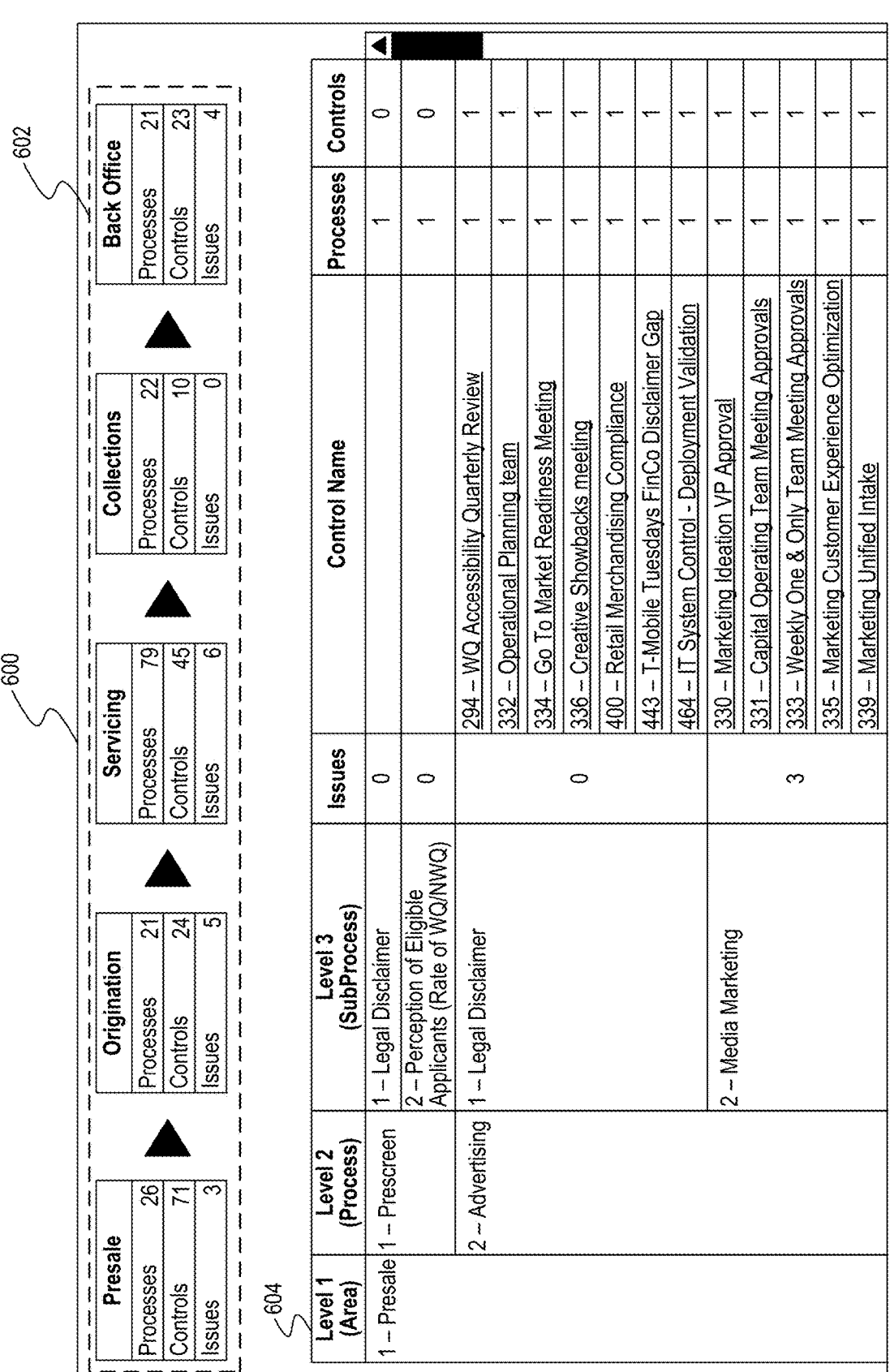
FIG. 6 illustrates one example of an interface view for the framework.

FIG. 6 illustrates one example of an interface view 600 for a framework. The interface view 600 includes a series of ordered process areas 602 of a particular process lifecycle. The series of ordered process areas 602 in the illustrated example include presale, origination, servicing, collections, and back office. Each of the series of ordered process areas 602 are presented as a graphical table with associated processes, controls, and issues. In some implementations, the table and/or the content of that table enables an end user to drill down and obtain related information. For example, the "Presale" text of the series of ordered process areas 602 can be a hyperlink that is selectable to change the view of the interface. As shown, the presale area is selected such that a related table of hierarchical content 604 is displayed beneath the series of ordered areas 602. If another of the series of ordered areas 602 is selected, the table of hierarchical content 604 changes to present information for the selected stage.

If a particular process fails, the interface can show which controls were impacted by the failure. In some implementations, any and all owners of any impacted control can be notified of the failure. Hence, the issues indicated on the interface view 600 can be any issues from all over the organization, not just issues that are based on periodic audits of controlled systems. As a result, the issues that are identified are part of the operational nature of the framework and can be delivered to owners in a timely manner.

In the illustrated example, the table of hierarchical content 604 includes three levels, issues, control names, processes and controls. Level 1 is the highest level in this example and corresponds to a Presale area. Level 2 and Level 3 are lower levels, which can include different processes associated with Level 1. More specifically, Level 2 includes processes for the Level 1 Presale area, and Level 3 includes various sub-processes of the Level 2 processes. As shown, the table of hierarchical content 604 has flagged three issues related to a media marketing sub-process. The interface view 600 can alert users of any potential issues with a controlled process of the hierarchy. Moreover, the controls that are associated with each process of different levels are shown as selectable hyperlinks to allow a user to click through to more information about a particular control.

Figure 7:
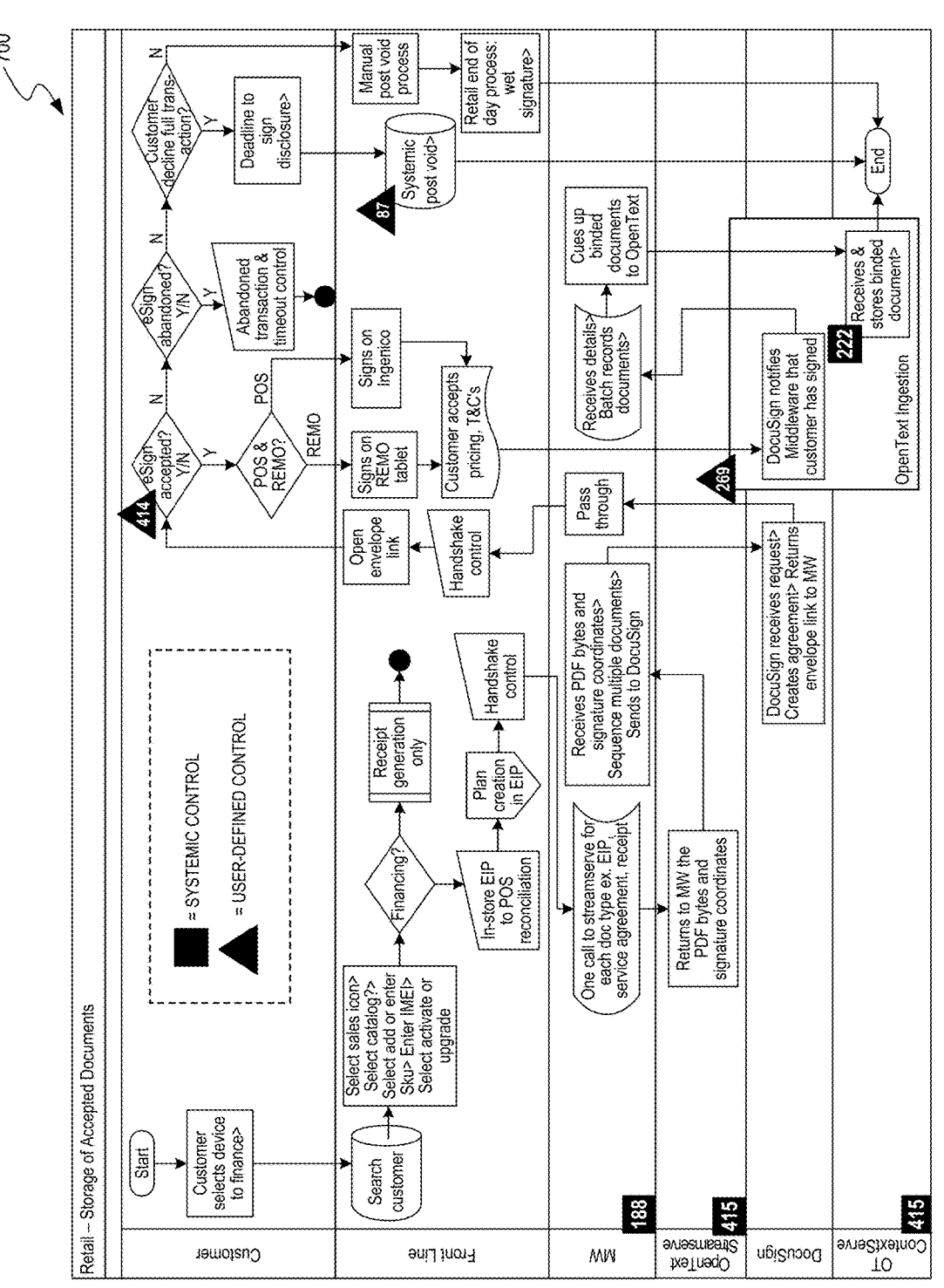
FIG. 7 illustrates an interface view that includes a workflow for the framework.

Another example of an interface view is a map that shows the topology of one or more controlled processes and/or systems. This form of visualization allows a user to identify the impact of a control (or lack thereof) relative to a workflow or arrangement of processes. For example, FIG. 7 illustrates an interface view that includes an example workflow map 700 for a controls framework. The workflow map 700 includes a map of processes and procedures that are subjected to particular controls. The topological map allows users to understand relative areas of the workflow map 700 that are subjected to particular controls. For example, a workflow can show the relationship among policies and procedures, which are hyperlinked to the controls shown on the table of FIG. 6. As such, a user can switch between the interface view 600 and workflow map 700 of particular controls for different systems. Hence, the user can use a single resource to obtain a broad range of controls information.

In some implementations, the controls can be shown on the topological map with indicators that distinguish between different types of controls and with additional data that uniquely identifies the control. For example, the controls in FIG. 7 are indicated with graphical indicators including triangles or squares icons that overlay a workflow 700. The square icons indicate system controls whereas the triangle icons indicate user-defined controls. Each icon includes a number that uniquely identifies that control. As such, the relative location of a particular control is visually indicated on the map of the workflow 700. A user can readily understand the possible scope of a control that is broken or has failed. The user can thus intuitively understand the state and scope of any control on the map in a visual way. For example, the "OT ContextServe" area of the workflow 700 has a systemic control 415 and a user-defined control 222 on the "Receives & stores binded document>" workflow item.

In some implementations, a graphical icon that indicates a control or process can be linked to a relevant description of policies and procedures, which can include a description of measures to mitigate risks. For example, FIG. 8 illustrates an example of detailed information that includes a reference to policies and procedures related to a control, process, or other feature of a controls framework. As such, for example, a user can readily visualize controls and failures in a topology of an IT system and obtain useful details to address those failures by linking to windows of information. Likewise, the analyst can visualize any gaps in the IT system by viewing the topological map.

FIG. 9 illustrates an interface view 900 that maps controls to any related processes at different levels of the framework. As shown, the interface view 900 includes a total count of controls 902 and total processes 904. A controls-to-process table 906 maps each control to one or more processes at each level. If a control breaks or fails, this view would show to a user processes at different levels that are impacted by that break or failure. As indicated above, processes could have various owners and the framework could enable contacting all users or entities that are impacted by the break or failure.

FIG. 10 illustrates an interface view 1000 that maps controls related to processes in one domain to controls in another domain. In other words, a control identifier in one domain is translated by mapping to a control identifier in another domain, both referring to the same or similar control. In the illustrated example, controls in an IT domain are mapped to controls in business units. As such, a user that is accustomed to interacting with controls in one domain can learn the relationship of a known control in another domain.

FIG. 11 illustrates an interface view 1100 that maps regulations to controls. As such, a user can quickly identify controls that would be affected by changed regulations. Moreover, the controls are mapped to processes at different levels and flag potential issues. As such, a user can readily identify the controls, processes, and associated issues that could be impacted by a change in a regulation or any other rule that requires compliance by an organization.

FIG. 12 illustrates an interface view 1200 for tracking controls of a framework. As shown, control names are mapped to processes at different hierarchical levels. The controls are associated with dates of their implementation as well as a risk assessment score. As such, an analyst can track the state of a particular control to determine a relative weakness and potential gaps that are posed by particular processes.

FIG. 13 illustrates an interface view 1300 that shows assessments of controls. As shown, the interface view 1300 includes output of a risk computation. The illustrated output includes a summary of total assessments 1302, passes 1304 and fails 1306 of the total assessments 1302, and an indication of any assessments in-progress 1308. Hence, the ongoing pass rate of the assessments can be determined with this information.

The table 1310 below the summary includes detailed information about particular assessments. The detailed information includes processes at different levels mapped to control names and associated failures. The table also provides notes associated with the failures. As such, ongoing risk-based assessments can be tracked and reported to maintain legal, IT, and operational control effectiveness. A timely feedback loop of assessments can be created for an entire area of an organization or a targeted process.

Figure 14:
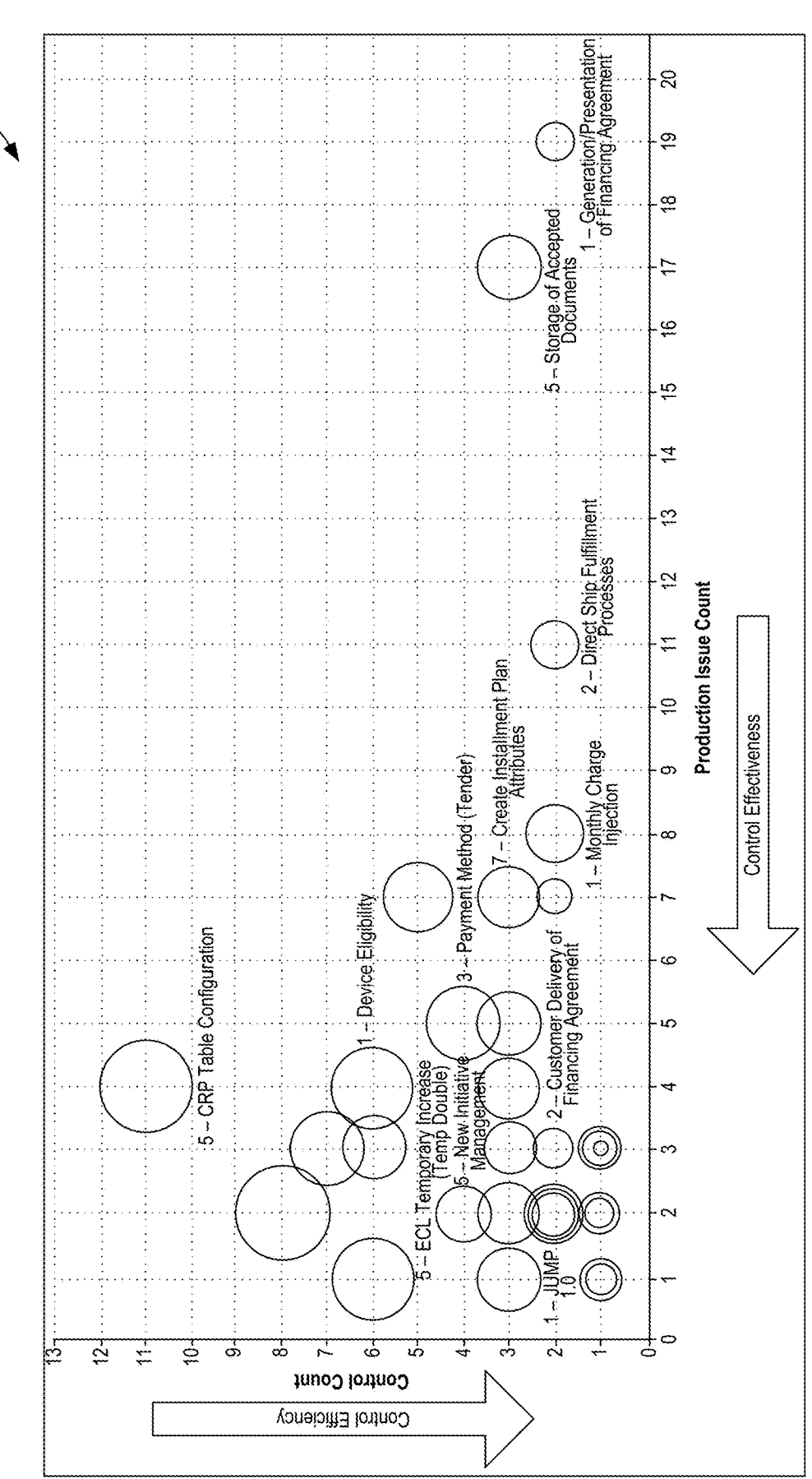
FIG. 14 illustrates an interface view including a graph that shows efficiency versus effectiveness of controls.

FIG. 14 illustrates another interface view 1400 including a graph that shows efficiency versus effectiveness of controls. As such, a user can analyze this visualization to determine whether a process is being over-controlled or under-controlled. Consequently, the user can readily understand whether a company is wasting money (by over-controlling a process) or exposing the company to risk (by under-controlling a process). This helps to identify whether controls are performing as expected with as much efficiency as possible.

Figure 15:
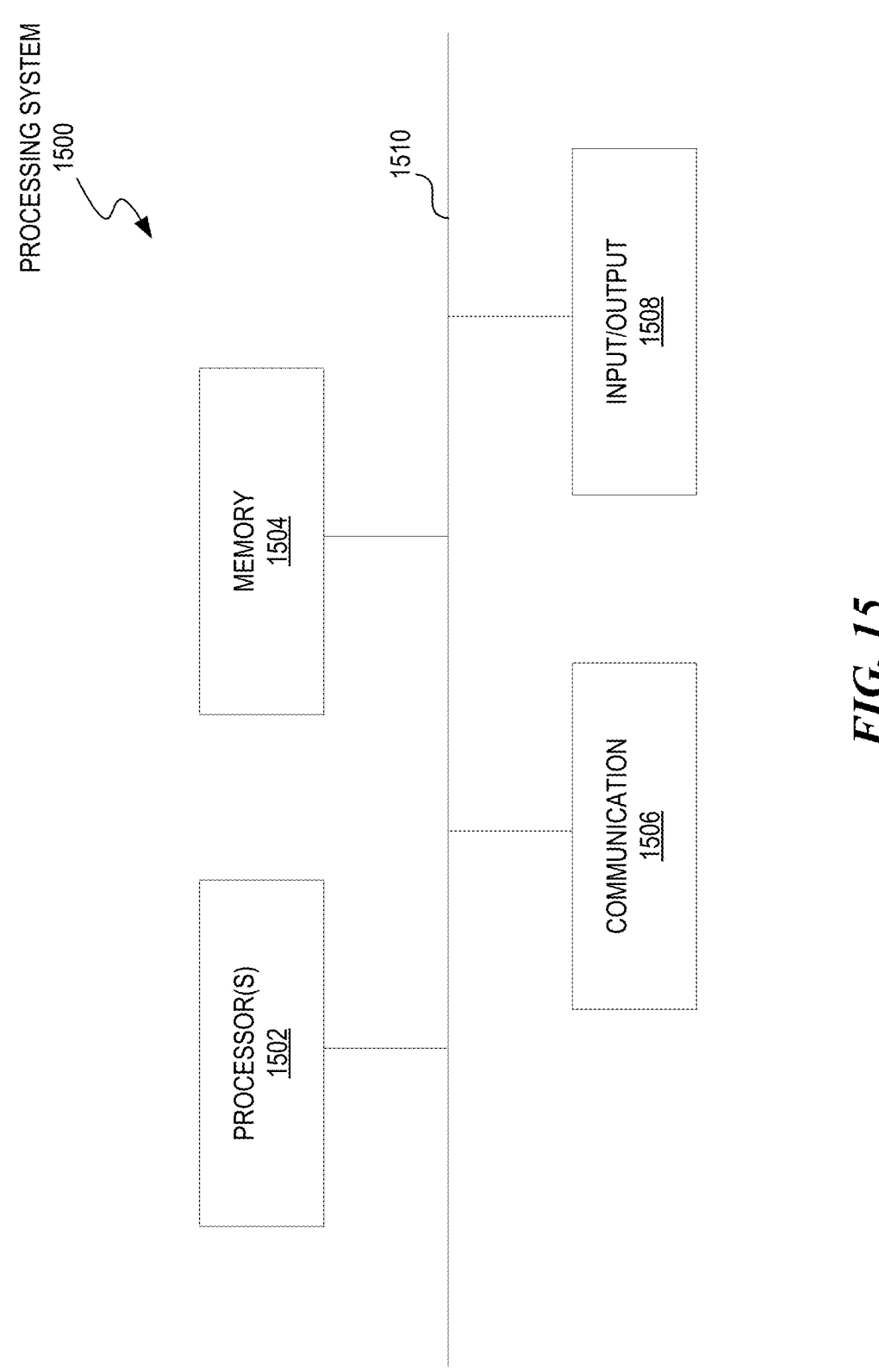
FIG. 15 is a block diagram that illustrates an example processing system in which aspects of the disclosed technology can be embodied.

FIG. 15 is a block diagram illustrating an example of a processing system 1500 in which at least some operations described herein can be implemented. The processing system 1500 represents a system that can run any of the methods/algorithms of the controls framework. The processing system 1500 can include one or more processing devices, which can be coupled to each other via a network or multiple networks. A network can be referred to as a communication network or telecommunications network.

In the illustrated embodiment, the processing system 1500 includes one or more processors 1502, memory 1504, a communication device 1506, and one or more input/output (I/O) devices 1508, all coupled to each other through an interconnect 1510. The interconnect 1510 can be or include one or more conductive traces, buses, point-to-point connections, controllers, adapters and/or other conventional connection devices. Each of the processor(s) 1502 can be or include, for example, one or more general-purpose programmable microprocessors or microprocessor cores, microcontrollers, application specific integrated circuits (ASICs), programmable gate arrays, or the like, or a combination of such devices.

The processor(s) 1502 control the overall operation of the processing system 1500. Memory 1504 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 1504 can store data and instructions that configure the processor(s) 1502 to execute operations in accordance with the techniques described above. The communication device 1506 can be or include, for example, an Ethernet adapter, cable modem, Wi-Fi adapter, cellular transceiver, Bluetooth transceiver, or the like, or a combination thereof. Depending on the specific nature and purpose of the processing system 1500, the I/O devices 1508 can include devices such as a display (which can be a touch screen display), audio speaker, keyboard, mouse or other pointing device, microphone, camera, etc.

While processes or blocks are presented in a given order, alternative implementations can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the implementations described above can be combined with each other, except to the extent that it may be stated otherwise above, or to the extent that any such implementations might be mutually exclusive in function and/or structure. Although the present invention has been described with reference to specific exemplary implementations, it will be recognized that the invention is not limited to the implementations described but can be practiced with modification and alteration within the spirit and scope of the disclosed implementations. Accordingly, the specification and drawings are to be regarded in an illustrative sense rather than a restrictive sense.

Physical and functional components (e.g., devices, engines, modules, and data repositories) associated with processing system 1500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some implementations, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some implementations, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some implementations, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed implementations may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

I claim:

1. A process-control system for uniform monitoring of computer-implemented controls associated with different domains of an organization, the process-control system comprising:

one or more processors; and memory comprising instructions that, when executed by the one or more processors, cause the process-control system to:

generate a hierarchical map of one or more operational processes implemented for the organization, the hierarchical map including a plurality of hierarchical levels that each identify (i) operational processes, or (ii) operational sub-processes within an operational process or sub-process defined in a higher hierarchical level, wherein each level indicates an end-to-end lifecycle order of the operational processes or sub-processes identified by each level, and wherein the one or more operational processes correspond to a plurality of computer-implemented controls associated with two or more domains of the organization;

generate, using a translation table that identifies computer-implemented controls originating from different domains with overlapping actions over a common operational process or sub-process implemented for the organization, one or more uniform control identifiers representing subsets of computer-implemented controls from the plurality of computer-implemented controls associated with two or more domains that correspond to the one or more operational processes of the hierarchical map;

determine a hierarchical arrangement for the plurality of computer-implemented controls via linking each of the one or more uniform control identifiers to a corresponding operational process or sub-process in the hierarchical map;

determine a risk measure for the organization based on determining whether each operational process and sub-process is linked with uniform control identifiers that comprise an optimized number of computer-implemented controls of the hierarchical arrangement, the optimized number corresponding to a respective hierarchical level of the hierarchical arrangement for the uniform control identifiers linked to each operational process and sub-process;

display, at a user interface enabling user management of the plurality of computer-implemented controls, the determined risk measure and a corresponding graphical representation that maps the one or more uniform control identifiers to the linked operational processes or sub-processes in the hierarchical map based on the hierarchical arrangement; and responsive to user selection of a user-selectable interface element linked to the corresponding graphical representation, generate for display, at the user interface, a set of graphical indicators that visually groups the one or more uniform control identifiers and the corresponding subsets of computer-implemented controls based on the two or more domains of the organization.

2. The process-control system of claim 1, wherein the risk measure is further determined based on comparing a number of computer-implemented controls linked to a given operational process or sub-process with a number of production issues experienced by the given operational process or sub-process.

3. The process-control system of claim 1, wherein the instructions further cause the process-control system to:

generate a topological workflow map that describes flows between the operational processes and sub-processes;

co-locate a reference to a computer-implemented control with an operational process or sub-process in the topological workflow map based on the computer-implemented control being linked to the operational process or sub-process; and switch from the display of the hierarchical map to a display of the topological workflow map.

4. The process-control system of claim 3, wherein the reference to the computer-implemented control indicates whether the computer-implemented control is a systemic control or a user-defined control and further indicates a unique identifier number for the computer-implemented control.

5. The process-control system of claim 3, wherein the instructions further cause the process-control system to:

in response to a user interaction with the reference to the computer-implemented control, further switch from the display of the topological workflow map to a display of documentation information for the computer-implemented control.

6. The process-control system of claim 1, wherein the risk measure indicates an effect of a given computer-implemented control on an operational process or sub-process that is different than a given operational process or sub-process to which the given computer-implemented control is linked.

7. The process-control system of claim 1, wherein the instructions further cause the process-control system to:

in response to a failure output of a given computer-implemented control, report, to a user, downstream effects of the failure output that are determined based on the end-to-end lifecycle order indicated within the hierarchical map.

8. A computer-implemented method for uniform monitoring of computer-implemented controls associated with different domains of an organization, the computer-implemented method comprising:

generating, via at least one processor a hierarchical map of one or more operational processes implemented for the organization, the hierarchical map including a plurality of hierarchical levels that each identify (i) operational processes, or (ii) operational sub-processes within an operational process or sub-process defined in a higher hierarchical level, wherein each level indicates an end-to-end lifecycle order of the operational processes or sub-processes identified by each level, and wherein the one or more operational processes correspond to a plurality of computer-implemented controls associated with two or more domains of the organization;

generating, via the at least one processor and using a translation table that identifies computer-implemented controls originating from different domains with overlapping actions over a common operational process or sub-process implemented for the organization, one or more uniform control identifiers representing subsets of computer-implemented controls from the plurality of computer-implemented controls associated with two or more domains that correspond to the one or more operational processes of the hierarchical map;

determining, via the at least one processor, a hierarchical arrangement for the plurality of computer-implemented controls via linking each of the one or more uniform control identifiers to a corresponding operational process or sub-process in the hierarchical map;

determining, via the at least one processor, a risk measure for the organization based on determining whether each operational process and sub-process is linked with uniform control identifiers that comprise an optimized number of computer-implemented controls of the hierarchical arrangement, the optimized number corresponding to a respective hierarchical level of the hierarchical arrangement for the uniform control identifiers linked to each operational process and sub-process;

displaying, via the at least one processor and at a user interface enabling user management of the plurality of computer-implemented controls, the determined risk measure and a corresponding graphical representation that maps the one or more uniform control identifiers to the linked operational processes or sub-processes in the hierarchical map based on the hierarchical arrangement; and responsive to user selection of a user-selectable interface element linked to the corresponding graphical representation, generating, via the at least one processor, for display, at the user interface, a set of graphical indicators that visually groups the one or more uniform control identifiers and the corresponding subsets of computer-implemented controls based on the two or more domains of the organization.

9. The method of claim 8, wherein the risk measure is further determined based on comparing a number of computer-implemented controls linked to a given operational process or sub-process with a number of production issues experienced by the given operational process or sub-process.

10. The method of claim 8, further comprising:

generating a topological workflow map that describes flows between the operational processes and sub-processes;

co-locating a reference to a computer-implemented control with an operational process or sub-process in the topological workflow map based on the computer-implemented control being linked to the operational process or sub-process; and switching from the display of the hierarchical map to a display of the topological workflow map.

11. The method of claim 10, wherein the reference to the computer-implemented control indicates whether the computer-implemented control is a systemic control or a user-defined control and further indicates a unique identifier number for the computer-implemented control.

12. The method of claim 10, further comprising:

in response to a user interaction with the reference to the computer-implemented control, further switching from the display of the topological workflow map to a display of documentation information for the computer-implemented control.

13. The method of claim 8, wherein the risk measure indicates an effect of a given computer-implemented control on an operational process or sub-process that is different than a given operational process or sub-process to which the given computer-implemented control is linked.

14. The method of claim 8, further comprising:

in response to a failure output of a given computer-implemented control, reporting, to a user, downstream effects of the failure output that are determined based on the end-to-end lifecycle order indicated within the hierarchical map.

15. At least one non-transitory computer-readable storage medium comprising instructions that, when executed by at least one processor of a computing system for uniform monitoring of computer-implemented controls associated with different domains of an organization, cause the computing system to:

generate a hierarchical map of one or more operational processes implemented for the organization, the hierarchical map including a plurality of hierarchical levels that each identify (i) operational processes, or (ii) operational sub-processes within an operational process or sub-process defined in a higher hierarchical level, wherein each level indicates an end-to-end lifecycle order of the operational processes or sub-processes identified by each level, and wherein the one or more operational processes correspond to a plurality of computer-implemented controls associated with two or more domains of the organization;

generate, using a translation table that identifies computer-implemented controls originating from different domains with overlapping actions over a common operational process or sub-process implemented for the organization, one or more uniform control identifiers representing subsets of computer-implemented controls from the plurality of computer-implemented controls associated with two or more domains that correspond to the one or more operational processes of the hierarchical map;

determine a hierarchical arrangement for the plurality of computer-implemented controls via linking each of the one or more uniform control identifiers to a corresponding operational process or sub-process in the hierarchical map;

determine a risk measure for the organization based on determining whether each operational process and sub-process is linked with uniform control identifiers that comprise an optimized number of computer-implemented controls of the hierarchical arrangement, the optimized number corresponding to a respective hierarchical level of the hierarchical arrangement for the uniform control identifiers linked to each operational process and sub-process;

display, at a user interface enabling user management of the plurality of computer-implemented controls, the determined risk measure and a corresponding graphical representation that maps the one or more uniform control identifiers to the linked operational processes or sub-processes in the hierarchical map based on the hierarchical arrangement; and responsive to user selection of a user-selectable interface element linked to the corresponding graphical representation, generate for display, at the user interface, a set of graphical indicators that visually groups the one or more uniform control identifiers and the corresponding subsets of computer-implemented controls based on the two or more domains of the organization.

16. The at least one non-transitory computer-readable storage medium of claim 15, wherein the risk measure is further determined based on comparing a number of computer-implemented controls linked to a given operational process or sub-process with a number of production issues experienced by the given operational process or sub-process.

17. The at least one non-transitory computer-readable storage medium of claim 15, wherein the instructions further cause the computing system to:

generate a topological workflow map that describes flows between the operational processes and sub-processes;

co-locate a reference to a computer-implemented control with an operational process or sub-process in the topological workflow map based on the computer-implemented control being linked to the operational process or sub-process; and switch from the display of the hierarchical map to a display of the topological workflow map.

18. The at least one non-transitory computer-readable storage medium of claim 17, wherein the reference to the computer-implemented control indicates whether the computer-implemented control is a systemic control or a user-defined control and further indicates a unique identifier number for the computer-implemented control.

19. The at least one non-transitory computer-readable storage medium of claim 17, wherein the instructions further cause the computing system to:

in response to a user interaction with the reference to the computer-implemented control, further switch from the display of the topological workflow map to a display of documentation information for the computer-implemented control.

20. The at least one non-transitory computer-readable storage medium of claim 15, wherein the risk measure indicates an effect of a given computer-implemented control on an operational process or sub-process that is different than a given operational process or sub-process to which the given computer-implemented control is linked.

* * * * *